United States Patent
Balasubramanian et al.

(10) Patent No.: US 11,505,149 B2
(45) Date of Patent: Nov. 22, 2022

(54) METHOD AND APPARATUS FOR CONTROLLING AN ACTUATABLE PROTECTION DEVICE WITH ENHANCED ROLLOVER DISCRIMINATION

(71) Applicant: ZF FRIEDRICHSHAFEN AG, Friedrichshafen (DE)

(72) Inventors: Kiran Balasubramanian, Canton, MI (US); Annette Schanz, Freiberg (DE); Huahn-Fern Yeh, Novi, MI (US); Charles A. Bartlett, Commerce Township, MI (US)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 264 days.

(21) Appl. No.: 16/816,432

(22) Filed: Mar. 12, 2020

(65) Prior Publication Data

US 2021/0284092 A1 Sep. 16, 2021

(51) Int. Cl.
| | | |
|---|---|---|
| *B60R 21/00* | (2006.01) | |
| *B60R 21/01* | (2006.01) | |
| *B60R 21/013* | (2006.01) | |
| *B60R 21/0132* | (2006.01) | |
| *B60W 40/10* | (2012.01) | |
| *B60W 40/109* | (2012.01) | |
| *B60W 40/11* | (2012.01) | |

(Continued)

(52) U.S. Cl.
CPC ....... *B60R 21/0132* (2013.01); *G05D 1/0055* (2013.01); *B60R 2021/0018* (2013.01); *B60R 2021/01013* (2013.01); *B60R 2021/01306* (2013.01); *B60R 2021/01322* (2013.01); *G05D 2201/0213* (2013.01)

(58) Field of Classification Search
CPC .. B60R 2021/0018; B60R 2021/01013; B60R 2021/01306; B60R 2021/01322; B60R 21/0132; G05D 1/0055; G05D 2201/0213
USPC ......................................................... 701/45
See application file for complete search history.

(56) References Cited

U.S. PATENT DOCUMENTS

| | | |
|---|---|---|
| 5,935,182 A | 8/1999 | Foo et al. |
| 6,036,225 A | 3/2000 | Foo et al. |
| 6,687,575 B2 | 2/2004 | Mattes et al. |

(Continued)

FOREIGN PATENT DOCUMENTS

| | | |
|---|---|---|
| DE | 102006045303 B3 | 2/2008 |
| DE | 102007024821 B3 | 11/2008 |

*Primary Examiner* — Harry Y Oh
*Assistant Examiner* — Hossam M Abd El Latif
(74) *Attorney, Agent, or Firm* — Tarolli, Sundheim, Covell & Tummino LLP

(57) ABSTRACT

A method for controlling the actuation of an actuatable restraint to help protect a vehicle occupant in response to a rollover event is implemented in a controller of a vehicle safety system that includes the actuatable restraint. To implement the method, the controller is configured to execute a roll discrimination metric that discriminates the occurrence of a ramp rollover event or an embankment rollover event in response to a vehicle roll rate (R_RATE) having a magnitude that exceeds a predetermined threshold roll rate (R_RATE). The controller is also configured to execute a switching metric that is operative to reduce the predetermined threshold roll rate (R_RATE) in response to a vehicle pitch rate (P_RATE) having a magnitude that exceeds a predetermined threshold pitch rate (P_RATE).

19 Claims, 7 Drawing Sheets

(51) Int. Cl.
  *B60W 40/112* (2012.01)
  *G05D 1/00* (2006.01)

(56) References Cited

U.S. PATENT DOCUMENTS

| | | |
|---|---|---|
| 7,359,781 B2 | 4/2008 | Foo et al. |
| 8,525,728 B2 | 9/2013 | Lundmark et al. |
| 9,855,915 B2 | 1/2018 | Foo et al. |
| 10,293,836 B2 | 5/2019 | Laakmann et al. |
| 2006/0036360 A1* | 2/2006 | Schubert ............. B60R 21/0132 340/440 |
| 2009/0138160 A1 | 5/2009 | Lyoda |
| 2010/0211245 A1* | 8/2010 | Tichy ................. B60R 21/0133 701/31.4 |
| 2011/0040453 A1* | 2/2011 | Doerr .................. B60R 21/0132 701/45 |
| 2012/0330512 A1 | 12/2012 | Mahlisch |
| 2013/0332032 A1* | 12/2013 | Korn .................. B60R 21/0132 701/45 |
| 2017/0166151 A1* | 6/2017 | Gergely ............... B60R 21/013 |
| 2018/0244230 A1* | 8/2018 | Gortsas ............... B60W 40/107 |
| 2019/0039548 A1* | 2/2019 | Muthukumar .......... B60R 21/13 |
| 2019/0184926 A1* | 6/2019 | Jang .................... B60R 21/013 |

\* cited by examiner

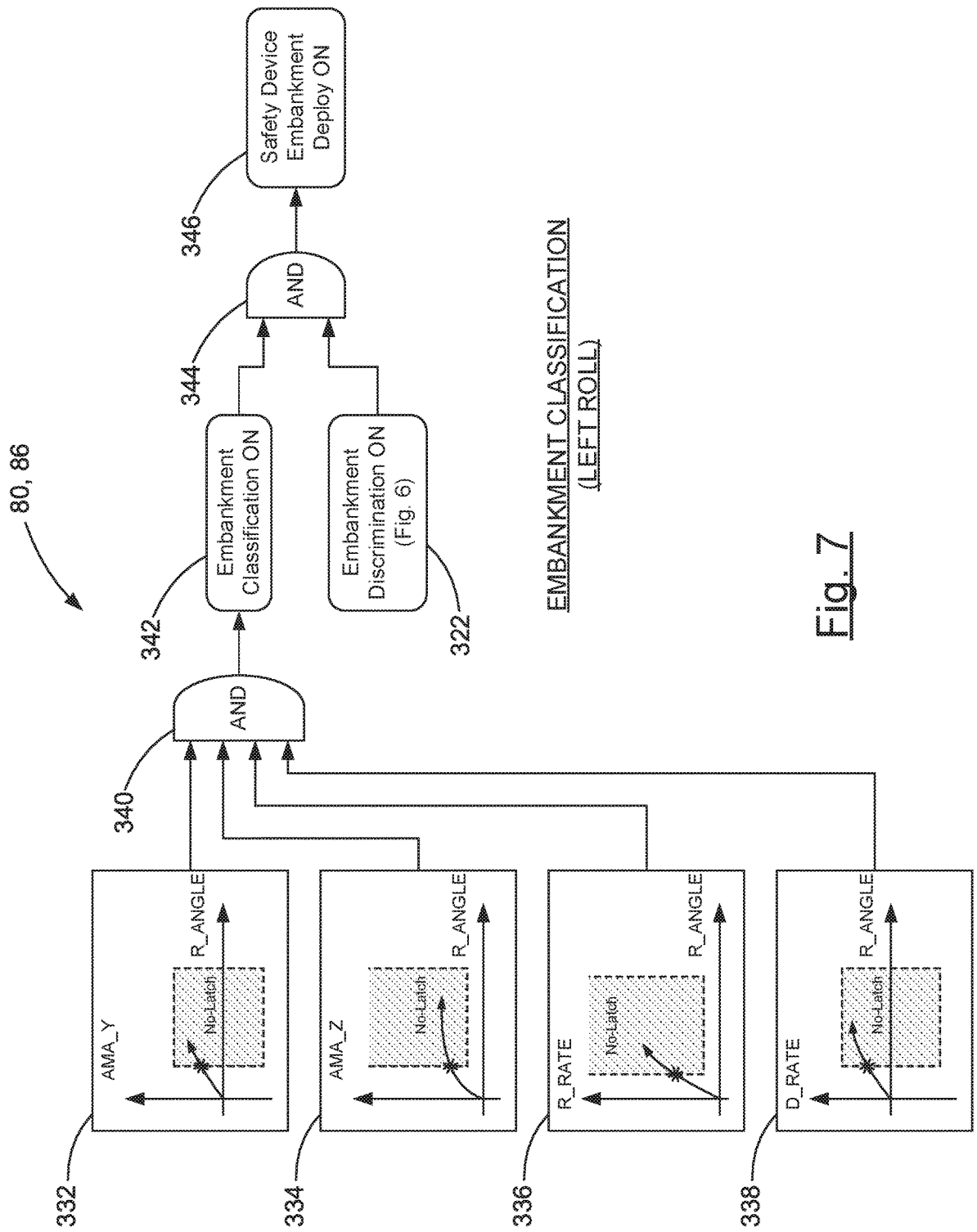

METHOD AND APPARATUS FOR CONTROLLING AN ACTUATABLE PROTECTION DEVICE WITH ENHANCED ROLLOVER DISCRIMINATION

TECHNICAL FIELD

The present invention relates to a method and apparatus for controlling a vehicle actuatable occupant protection device and, in particular, to an enhanced discrimination method and apparatus for classifying several particular types of rollover vehicle crash events.

BACKGROUND

Vehicle safety systems include a central control unit, sometimes referred as an airbag control unit ("ACU"), that utilizes sensors, both local to the ACU and remote from the ACU, to detect the occurrence of crash events involving the vehicle and to determine whether those events warrant the activation of actuatable restraints, such as airbags and seatbelt retractors. The sensors utilized by the ACU can include accelerometers and other sensors, such as impact sensors, seatbelt buckle switches, seat pressure switches, steering angle sensors, etc. Using data from these sensors, the ACU can determine the occurrence of vehicle crash events and can perform discrimination algorithms to classify the crash event as being one of a particular type. The ACU can actuate the actuatable restraints according to the particular type of crash event.

For vehicle safety systems, it is desirable to discriminate amongst the various crash events in which a vehicle can be involved. To "discriminate" a crash event can mean to classify the crash event as being of one particular type of crash event and distinguish that crash event from other types of crash events. If the vehicle safety system can discriminate or identify the crash event as being of one particular type, the actuatable restraints can be actuated in a manner tailored to that particular type of crash event. "Crash events," as used herein, can be used to encompass various events involving the vehicle. For example, crash events can be collisions or impacts in which the vehicle collides with, impacts, or otherwise engages different types of structures. These crash events can be collisions with a deformable barrier, such as another vehicle, or collisions with a non-deformable barrier, such as a tree or utility pole. As another example, crash events can also involve events, such as rollover events, where vehicle impacts result from the rolling over of the vehicle. Rollover events can result from a vehicle sliding sideways and striking a curb, from sliding or otherwise moving off the side of the road down an embankment or ditch, or from sliding or otherwise moving off the side of the road up a ramp, such as a hill.

Vehicle safety systems can be configured or adapted to discriminate those events for which deployment of the actuatable restraints is desired ("deployment events") from those events for which deployment of the actuatable restraints is not desired ("non-deployment events"). Crash discrimination entails determining the type of event, e.g., deformable barrier, non-deformable barrier, front impact crash, rear impact crash, side impact crash, oblique crash, offset crash, rollover, etc. Crash discrimination also entails determining the severity of the crash and implementing safing functions that act as checks or permissives to ensure that the actuatable restraints are deployed in a safe manner.

From the above, it will be appreciated that it can be desirable to control the actuation and timing of the actuatable restraints in the safety system in response to the type and/or severity of the crash event in which the vehicle is involved. To determine which occupant protection devices to actuate in response to a sensed crash event, the safety system can implement a crash evaluation process to discriminate between types of crash events. If the identified crash event meets or exceeds a severity threshold, and the safing functions agree, the actuatable restraints can be actuated in a manner commensurate with the discriminated event type.

Over the years, safety standards are modified and updated to "push the envelope" when it comes to automotive safety. As a result, in keeping up with the standards, automobile manufacturers are pushed to constantly improve the safety of their products. As the standards become more rigorous, the safety systems adapt and become more complex and capable. Through the evolution of vehicle safety systems, it has been discovered that crash classification is one of the key aspects that helps determine the efficacy of the system. If the safety system can accurately and robustly identify the crash scenario as defined by a safety standard, it can take measures tailored to produce the best results for occupants involved in accidents for which the standard is designed.

While vehicle safety systems have been developed with the ability to discriminate a variety of crash events, there exists a continuing need to further classify and discriminate amongst crash events so that the vehicle safety system can take the appropriate responsive action. Among the crash events for which discrimination can be desired are different types of crash events, such as rollover events or events that can result in a rollover.

Rollover crash events are those for which it may be desirable to actuate safety devices, such as side airbags (curtain airbags, thorax airbags) and/or seatbelt pretensioners. Rollover crash events can occur in a variety of scenarios. For example, a vehicle can lose control and skid sideways off the road onto the adjacent grass/soil, down an embankment, into a ditch, or up a ramp or hill. As another example, a vehicle can lose control and skid sideways into a low barrier, such as a curb. In any of these scenarios, the magnitude of the resulting rollover crash event may warrant actuating one or more vehicle safety devices.

SUMMARY

According to one aspect, a vehicle safety system includes an actuatable restraint for helping to protect a vehicle occupant and a controller for controlling actuation of the actuatable restraint in response to a vehicle rollover event. The controller is configured to execute a roll discrimination metric that discriminates the occurrence of a ramp rollover event or an embankment rollover event in response to a vehicle roll rate (R_RATE) having a magnitude that exceeds a predetermined threshold roll rate (R_RATE). The controller is also configured to execute a switching metric that is operative to reduce the predetermined threshold roll rate (R_RATE) in response to a vehicle pitch rate (P_RATE) having a magnitude that exceeds a predetermined threshold pitch rate (P_RATE).

According to another aspect, alone or in combination with other aspects described herein, the roll discrimination metric can evaluate the roll rate (R_RATE) to detect the occurrence of a ramp event in response to the roll rate (R_RATE) having a magnitude that exceeds a ramp event threshold, or an embankment event in response to the roll rate (R_RATE) having a magnitude that exceeds an embankment event threshold.

According to another aspect, alone or in combination with other aspects described herein, in response to the pitch rate (P_RATE) having a magnitude that exceeds the predetermined threshold pitch (P_RATE), the roll discrimination metric can evaluate the roll rate (R_RATE) to detect the occurrence of a ramp event in response to the roll rate (R_RATE) having a magnitude that exceeds a switched ramp event threshold, or an embankment event in response to the roll rate (R_RATE) having a magnitude that exceeds a switched embankment event threshold.

According to another aspect, alone or in combination with other aspects described herein, the roll discrimination metric can evaluate the roll rate (R_RATE) vs. vehicle roll angle (R_ANGLE).

According to another aspect, alone or in combination with other aspects described herein, the switching metric can evaluate the pitch rate (P_RATE) to detect the occurrence of a switch ramp event threshold condition in response to the pitch rate (P_RATE) having a magnitude that exceeds a ramp pitch switch threshold, or a switch embankment event threshold condition in response to the pitch rate (P_RATE) having a magnitude that exceeds an embankment pitch switch threshold.

According to another aspect, alone or in combination with other aspects described herein, the switching metric can evaluate the pitch rate (P_RATE) vs. vehicle roll angle (R_ANGLE).

According to another aspect, alone or in combination with other aspects described herein, the controller can be further configured to execute at least one of a ramp discrimination algorithm comprising a ramp classification portion configured to classify a ramp event, and an embankment discrimination algorithm comprising an embankment classification portion configured to classify an embankment event. The controller can be configured to deploy the actuatable restraint in response to the roll discrimination metric discriminating the occurrence of a ramp rollover event and the ramp classification portion classifying a ramp event. The controller can also be configured to deploy the actuatable restraint in response to the embankment discrimination metric discriminating the occurrence of an embankment rollover event and the embankment classification portion classifying an embankment event.

According to another aspect, alone or in combination with other aspects described herein, the system can also include an accelerometer for sensing vehicle lateral acceleration and providing a signal indicative of sensed vehicle lateral acceleration, an accelerometer for sensing vehicle vertical acceleration and providing a signal indicative of sensed vehicle vertical acceleration, a roll sensor for sensing vehicle roll values and providing a signal indicative of sensed vehicle roll values, and a pitch sensor for sensing vehicle pitch values and providing a signal indicative of sensed vehicle pitch. The controller can be configured to execute the roll discrimination metric and the switching metric using the signals provided by the accelerometers, the roll rate sensor, and the pitch rate sensor.

According to another aspect, alone or in combination with other aspects described herein, the actuatable restraints can include at least one of seatbelt anchor pretensioners, seatbelt retractor pretensioners, curtain airbags, thorax airbags, and side airbags.

According to another aspect, a method for controlling actuation of an actuatable restraint in response to a vehicle rollover event includes discriminating the occurrence of a ramp rollover event or an embankment rollover event in response to a vehicle roll rate (R_RATE) having a magnitude that exceeds a predetermined threshold roll rate (R_RATE). The method also includes reducing the predetermined threshold roll rate (R_RATE) in response to a vehicle pitch rate (P_RATE) having a magnitude that exceeds a predetermined threshold pitch rate (P_RATE).

According to another aspect, alone or in combination with other aspects described herein, discriminating the occurrence of a ramp rollover event or an embankment rollover event can include at least one of evaluating the roll rate (R_RATE) to detect the occurrence of a ramp event in response to the roll rate (R_RATE) having a magnitude that exceeds a ramp event threshold, and evaluating the roll rate (R_RATE) to detect the occurrence of an embankment event in response to the roll rate (R_RATE) having a magnitude that exceeds an embankment event threshold.

According to another aspect, alone or in combination with other aspects described herein, the method can include, in response to the pitch rate (P_RATE) having a magnitude that exceeds the predetermined threshold pitch rate (P_RATE), evaluating the roll rate (R_RATE) to detect the occurrence of at least one of a ramp event in response to the roll rate (R_RATE) having a magnitude that exceeds a switched ramp event threshold, and an embankment event in response to the roll rate (R_RATE) having a magnitude that exceeds a switched embankment event threshold.

According to another aspect, alone or in combination with other aspects described herein, discriminating the occurrence of a ramp rollover event or an embankment rollover event can include evaluating the roll rate (R_RATE) vs. vehicle roll angle (R_ANGLE).

According to another aspect, alone or in combination with other aspects described herein, reducing the predetermined threshold roll rate (R_RATE) in response to a vehicle pitch rate (P_RATE) having a magnitude that exceeds a predetermined threshold pitch rate (P_RATE) can include evaluating the pitch rate (P_RATE) to detect the occurrence of a switch ramp event threshold condition in response to the pitch rate (P_RATE) having a magnitude that exceeds a ramp pitch switch threshold, or a switch embankment event threshold condition in response to the pitch rate (P_RATE) having a magnitude that exceeds an embankment pitch switch threshold.

According to another aspect, alone or in combination with other aspects described herein, reducing the predetermined threshold roll rate (R_RATE) in response to a vehicle pitch rate (P_RATE) having a magnitude that exceeds a predetermined threshold pitch rate (P_RATE) can include evaluating the pitch rate (P_RATE) vs. vehicle roll angle (R_ANGLE).

According to another aspect, alone or in combination with other aspects described herein, the method can also include classifying a rollover event as a ramp event or an embankment event. The method can also include deploying the actuatable restraint in response to classifying the rollover event as a ramp event and discriminating the occurrence of a ramp rollover event. The method can also include deploying the actuatable restraint in response to classifying the rollover event as an embankment event and discriminating the occurrence of an embankment rollover event.

According to another aspect, alone or in combination with other aspects described herein, a vehicle safety system can include an actuatable restraint for helping to protect a vehicle occupant and a controller for controlling actuation of the actuatable restraint according to the methods described herein.

DRAWINGS

The foregoing and other features and advantages of the invention will become apparent to one skilled in the art upon consideration of the following description of the invention and the accompanying drawings in which:

FIG. 7 is a schematic block diagram illustrating classification metrics and deployment logic for an embankment rollover event, implemented in the vehicle safety system.

DESCRIPTION

The invention relates to a vehicle safety system that implements an enhanced discrimination algorithm that can discriminate between and classify ramp and embankment rollover events. The algorithm uses pitch rate sensing to switch classification thresholds in order to more quickly and accurately identify the ramp and embankment rollover events.

Because the invention is related to the enhanced discrimination of ramp and embankment rollover events, the vehicle safety system is shown and described herein as including the components and implementing the algorithms necessary to perform these particular enhanced discrimination functions. Those skilled in the art will appreciate that the vehicle safety system can include components in addition to those shown and described herein and can perform discrimination functions in addition to those shown and described herein.

Figure 1:
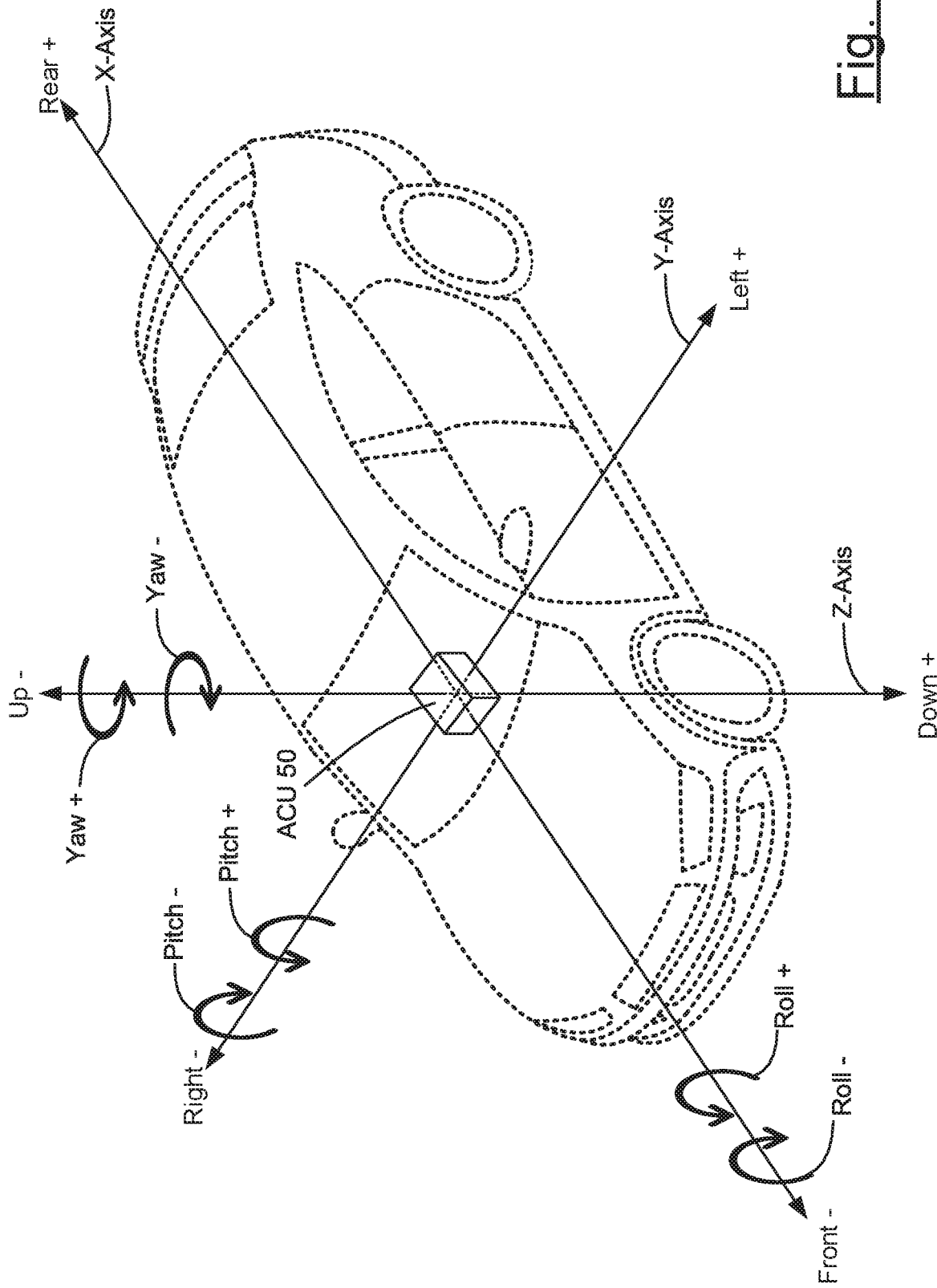
FIG. 1 is a schematic illustration block diagram illustrating a vehicle and the signals obtained from the sensor architecture deployed therein.

Referring to FIG. 1, according to one example configuration, a vehicle 12 includes a vehicle safety system 10 that includes a central control unit, referred to herein as an airbag control unit (ACU) 50. The ACU 50 is operative to actuate one or more actuatable restraints 20, such as left/right seatbelt pretensioners (anchor and/or retractor), left/right curtain airbags, left/right thorax airbags, and left/right side airbags. The ACU 50 can also be operative to control actuation of other protection devices, such as frontal airbags and knee airbags.

The ACU 50 includes one or more sensors that are operative to provide signals indicative of vehicle linear and/or angular accelerations and/or rates of movement in different directions and with respect to different vehicle axes. The sensors can be mounted locally in or on the ACU 50 itself or can be remote from the ACU and interconnected, e.g., via wire, to the ACU. These vehicle axes include an X-axis, which extends longitudinally in the vehicle in the direction of forward/rearward vehicle travel. A vehicle Y-axis extends laterally in the vehicle, perpendicular to the X-axis. A vehicle Z-axis extends vertically in the vehicle, perpendicular to both the X-axis and the Y-axis.

The X, Y, and Z axes are shown in FIG. 1 as intersecting at the ACU 50. This is because the ACU 50 includes sensors for measuring movement, i.e., acceleration, of the vehicle 12 with respect to the axes. These movements are identified in FIG. 1 with signage (+/−) indicating the sign, positive or negative, that the safety system 10 assigns the motion.

The vehicle safety system 10 is configured to interpret motions along the X-axis as positive front-to-rear (acceleration) and negative rear-to-front (deceleration). Motions along the Y-axis are interpreted as positive right-to-left and negative left-to-right. Motions along the Z-axis are interpreted as positive in the downward direction and negative in the upward direction.

The vehicle safety system 10 is configured to interpret motions about the X-axis, i.e., roll, is positive for left roll and negative for right roll. Motion about the Y-axis, i.e., pitch, is interpreted as positive for downward pitch (nose down) and negative for negative for upward pitch (nose up). Motion about the Z-axis, i.e., yaw, is interpreted as positive for left turn yaw and negative for right turn yaw.

Figure 2:
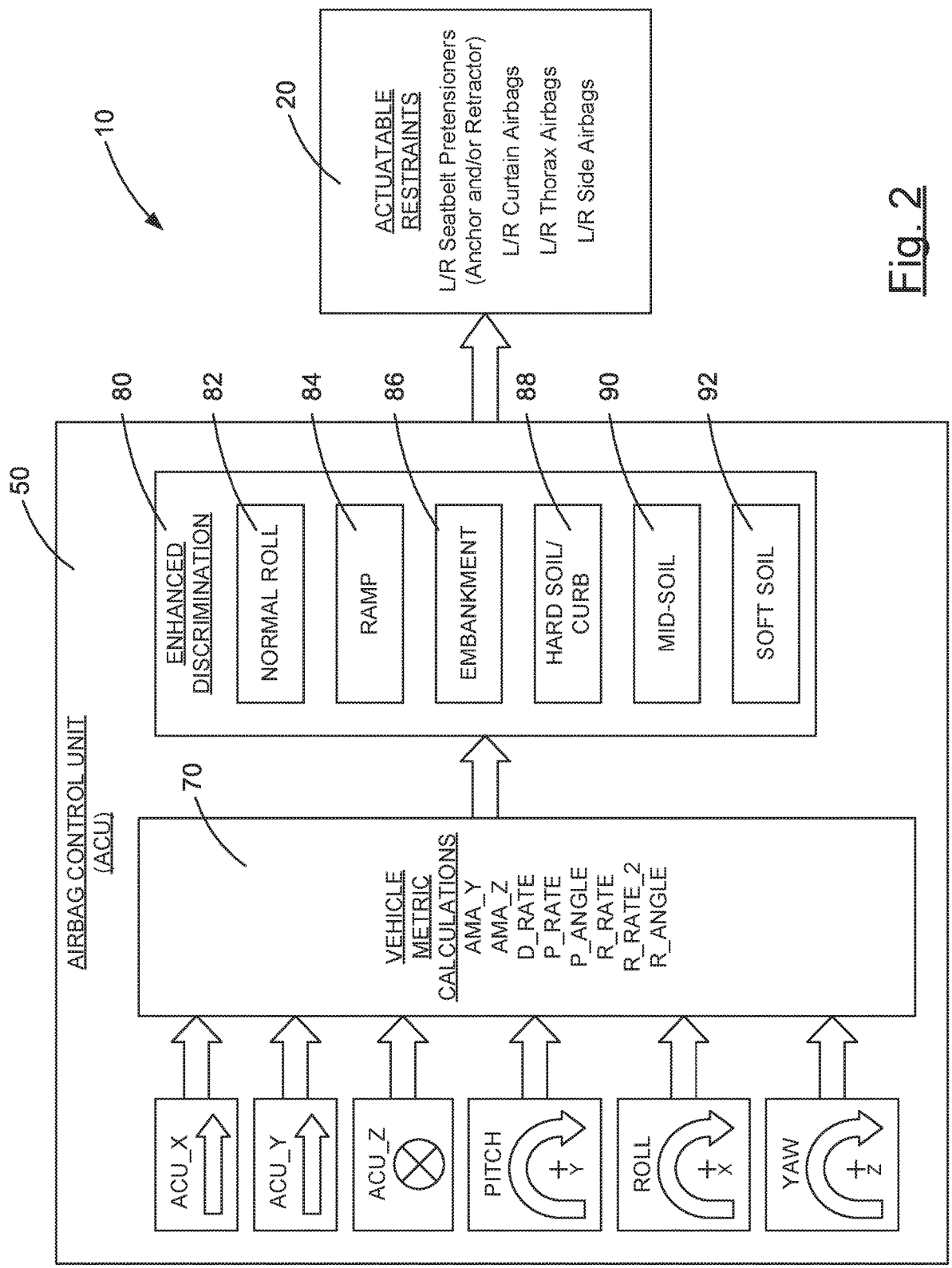
FIG. 2 is a block diagram illustrating a vehicle safety system.

Referring to FIG. 2, the ACU 50 includes an accelerometer 52 for sensing vehicle lateral (Y-axis) acceleration (ACU_Y). The ACU 50 also includes an accelerometer 54 for sensing vehicle vertical (Z-axis) acceleration (ACU_Z). Although not utilized in the discrimination algorithms disclosed herein, the ACU 50 can also include an accelerometer 56 for sensing vehicle longitudinal (X-axis) acceleration (ACU_X).

The ACU 50 also includes a pitch rate sensor 60 for sensing vehicle pitch rate values (PITCH), i.e., pitch rate about the vehicle Y-axis. The ACU 50 further includes a roll rate sensor 62 for sensing vehicle roll rate values (ROLL), i.e., roll rate about the vehicle X-axis. Although not utilized in the discrimination algorithms disclosed herein, the ACU 50 can also include a yaw rate sensor 64 for sensing yaw rate about the vehicle Z-axis.

It can be desirable to position the sensors on or near the respective axes along or about which they sense vehicle motion. Since the sensors can be mounted locally on the ACU 50, it can be desirable to mount the ACU at or near the vehicle center of mass, through which the vehicle X, Y, and Z axes pass. The position of the ACU 50 at or near the vehicle center of mass is not critical, and the ACU 50 could be positioned elsewhere in the vehicle.

Hardware and software configurations for ACUs implemented in vehicle safety systems are known in the art. Therefore, a detailed description of the hardware configuration of the ACU 50 is not necessary for one having ordinary skill in the art to understand and appreciate the vehicle safety system 10. The ACU 50 of FIG. 1 includes a central processing unit (CPU), such as a microcomputer, that is configured to receive the signals ACU_X, ACU_Y, ACU_Z, ROLL, PITCH, and YAW from their respective sensors, to perform vehicle metric calculations 70 on those signals, and to perform enhanced discrimination algorithms 80 utilizing the calculated metrics.

The vehicle metrics resulting from the calculations 62 include:

Vehicle lateral Y-axis acceleration moving average (AMA_Y).
    Vehicle vertical Z-axis acceleration moving average (AMA_Z).
    Vehicle roll difference rate, i.e., roll acceleration, (D_RATE).
    Vehicle pitch rate (P_RATE).
    Vehicle pitch angle (P_ANGLE).
    Vehicle roll rate (R_RATE).
    Vehicle roll rate 2 (R_RATE_2).
    Vehicle roll angle (R_ANGLE).
    The enhanced discrimination algorithms 80 include a normal rollover discrimination algorithm 82, a ramp discrimination algorithm 84, an embankment discrimination algorithm 86, a hard soil discrimination algorithm 88, a mid-soil soil discrimination algorithm 90, and a soft soil discrimination algorithm 92. The ACU 50 is configured to perform the vehicle metric calculations 70 and the enhanced discrimination algorithms 80, and determine which, if any, of the actuatable restraints 20 to actuate. For purposes of this disclosure, the discrimination algorithms for ramp events 84 and embankment events 86 are novel, inventive, and disclosed in detail.

Figure 3:
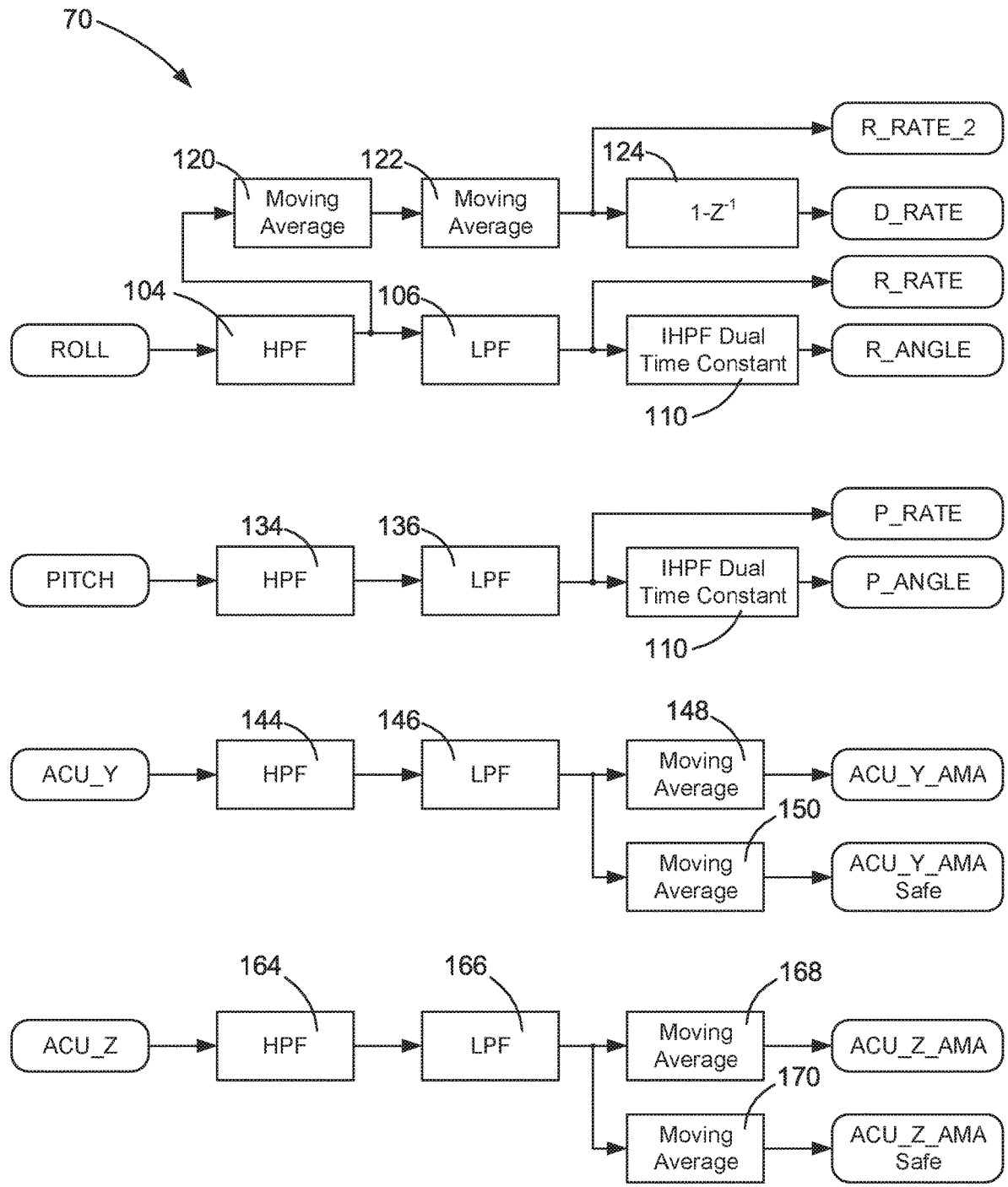
FIG. 3 is a block diagram illustrating metric calculations implemented in the vehicle safety system.

FIG. 3 illustrates the vehicle metric calculations 70 performed by the ACU 50. The elements of the vehicle metric calculations 70 shown in FIG. 2, referred to herein as "functions" performed internally by the ACU 50.

Roll Rate Metrics

The ACU 50 employs signal conditioning that includes analog to digital conversion (ADC) for converting ROLL, PITCH, ACU_Y and ACU_Z signals from the various accelerometers to digital signals. The ACU can also employ rail checking and bias adjustments. As shown in FIG. 3, the digitized and biased roll rate ROLL is passed to a high-pass filter (HPF) function 104 that, for example, can be selected to have a time constant which results in resetting the filter function after a predetermined time period, e.g., T=8 seconds. The high-pass filtered roll rate ROLL produced at HPF function 104 is passed to low-pass filter (LPF) function 106 that produces the roll rate metric R_RATE, which has a value indicative of vehicle roll rate (i.e., angular velocity), that is implemented in the enhanced discrimination algorithms 80 (see, FIG. 2). R_RATE is passed to integrating high-pass filter (IHPF) function 110, which includes an integrator function and a dual time constant high-pass filter function. The IHPF function 110 integrates the R_RATE signal to produce a value indicative of a determined relative roll angle of the vehicle. The IHPF function 110 also performs high-pass filtering of the R_RATE signal. The IHPF function 110 produces the metric R_ANGLE, which is implemented in the enhanced discrimination algorithms 80 (see, FIG. 2).

R_ANGLE is indicative of a normalized roll angle of the vehicle, which is a measure of relative angular rotation of the vehicle in response to a sensed roll rate. IHPF function 110 can reset the R_ANGLE based on a time constant for the high-pass filter function so that R_ANGLE provides an indication of angular rotation during the occurrence of a detected roll rate. R_ANGLE therefore may not indicate the actual angular orientation of the vehicle relative to the ground. In this way, the determination of a vehicle rollover condition need not depend on a determination of an initial angular orientation of the vehicle relative to the ground or road.

The high-pass filtered roll rate ROLL produced at HPF function 104 is also passed to moving average function 120 and then to moving average function 122. Each moving average function 120, 122 can, for example, be tunable to select the number of samples, e.g., 1-32 samples. The moving average functions 120, 122 smooth the variations in the roll rate, producing the metric R_RATE_2, which is implemented in the enhanced discrimination algorithms 80 (see, FIG. 2).

R_RATE_2 provided to difference function 124 where the difference between the current sample and the previous sample are compared. This produces differenced roll rate metric D_RATE, which is indicative of a rate of change, i.e., acceleration, of the roll rate. This roll acceleration D_RATE is the angular acceleration of the vehicle about the vehicle X-axis. The roll acceleration D_RATE is implemented in the enhanced discrimination algorithms 80 (see, FIG. 2).

Pitch Rate Metrics

As shown in FIG. 3, the digitized and biased pitch rate PITCH is passed to high-pass filter (HPF) function 134 that, for example, can be selected to have a time constant which results in resetting the filter function after a predetermined time period, e.g., T=8 seconds. The high-pass filtered pitch rate produced at HPF function 134 is passed to low-pass filter (LPF) function 136. LPF function 136 produces the pitch rate metric P_RATE, which has a value indicative of vehicle pitch rate (i.e., angular velocity), that is implemented in the enhanced discrimination algorithms 80 (see, FIG. 2).

Lateral Acceleration Metrics

As shown in FIG. 3, the digitized and biased lateral acceleration ACU_Y is passed to high-pass filter (HPF) function 144 that, for example, can be selected to have a time constant which results in resetting the filter function after a predetermined time period, e.g., T=8 seconds. The high-pass filtered lateral acceleration ACU_Y produces at HPF function 144 is passed to low-pass filter (LPF) function 146. The low-pass filtered lateral acceleration ACU_Y value produced at LPF function 146 is passed to moving average blocks 148 and 150, which produce the lateral acceleration metrics ACU_Y_AMA and ACU_Y_AMA SAFE metrics, respectively. The number of samples include in each of the moving average functions 148, 150 can be tuned within a predetermined range, such as 1-32 samples. ACU_Y_AMA and ACU_Y_AMA SAFE are lateral acceleration moving average values that are implemented in the enhanced discrimination algorithms 80 (see, FIG. 2).

Vertical Acceleration Metrics

As shown in FIG. 3, the digitized and biased vertical acceleration ACU_Z is passed to high-pass filter (HPF) function 164 that, for example, can be selected to have a time constant which results in resetting the filter function after a predetermined time period, e.g., T=8 seconds. The high-pass filtered lateral acceleration ACU_Z produces at HPF function 164 is passed to low-pass filter (LPF) function 166. The low-pass filtered lateral acceleration ACU_Z value produced at LPF function 166 is passed to moving average blocks 168 and 170, which produce the lateral acceleration metrics ACU_Z_AMA and ACU_Z_AMA SAFE metrics, respectively. The number of samples include in each of the moving average functions 168, 150 can be tuned within a predetermined range, such as 1-32 samples. ACU_Z_AMA and ACU_Z_AMA SAFE are lateral acceleration moving average values that are implemented in the enhanced discrimination algorithms 80 (see, FIG. 2).

Roll Discrimination

Figure 4:
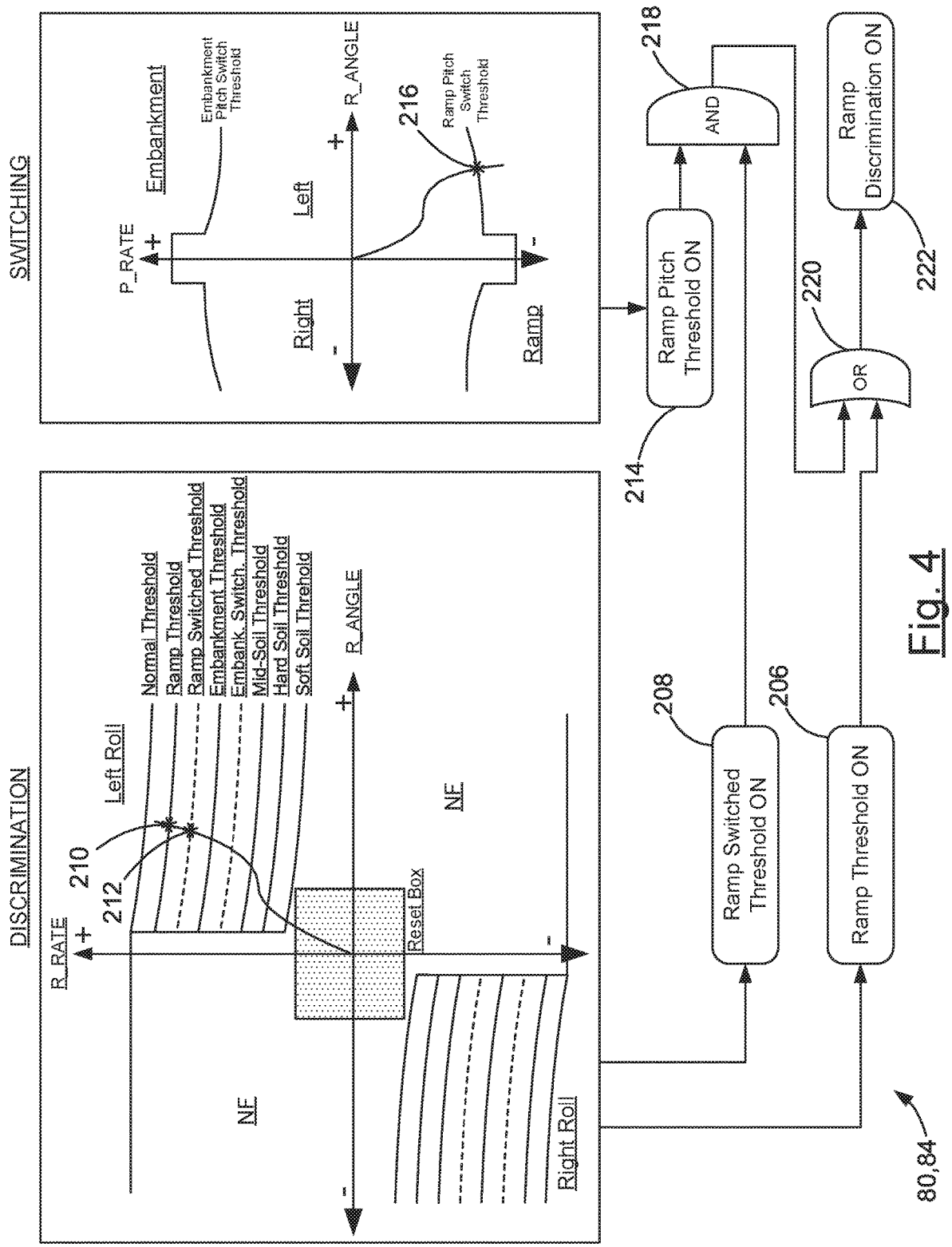
FIG. 4 is a diagram illustrating discrimination and switching metrics for determining the occurrence of a ramp rollover event, implemented in the vehicle safety system.

The enhanced discrimination algorithm 80 implements the ability to discriminate amongst various types of rollover events, which allows for the tailoring of the thresholds that trigger deployment of the actuatable restraints 20. Examples of some of these thresholds are illustrated in FIG. 4. As shown in FIG. 4, the enhanced discrimination algorithm 80 includes discrimination metrics 200 that employ various thresholds for determining whether sensed vehicle roll characteristics are indicative of the various different rollover event classifications. As shown in FIG. 4, the deployment threshold metrics are based on a comparison of R_RATE and R_ANGLE. The threshold determination of FIG. 4 illustrates left roll (i.e., roll toward the driver side) as being indicated by R_RATE and R_ANGLE values in the positive direction. Right roll (i.e., roll toward the passenger side) is also shown as being indicated by values for R_RATE and R_ANGLE in the opposite, i.e., negative direction.

As shown in FIG. 4, a soft soil rollover event classification has the lowest threshold for triggering deployment of the actuatable restraints. A hard soil condition has the next lowest rollover event classification threshold for triggering actuatable restraint deployment, followed by mid-soil, embankment, ramp, and normal rollover. These deployment threshold triggers can be latched, in which case the latch can be reset when the roll angle is equal to zero or the metric enters the reset box shown in FIG. 4.

The normal condition, i.e., none of the other thresholds are classified, results in the highest deployment trigger threshold. The normal condition can also be latched, in which case the latch can be reset when the roll rate is equal to zero or the metric enters the reset box shown in FIG. 4. Although the thresholds are shown in a particular order of magnitude in FIG. 4, it should be understood that the magnitudes associated with the thresholds can vary. For example, the hard soil threshold can be lower than the soft soil, etc. Nevertheless, the normal threshold is typically the highest threshold.

Enhanced Ramp Discrimination Using Pitch Rate Switching

Also shown in FIG. 4, the discrimination metrics 200 include a ramp switched threshold, which is illustrated in dashed lines. Advantageously, the ramp switched threshold has a magnitude that is lower than the corresponding un-switched counterparts, i.e., the ramp threshold. The switched ramp threshold, having a lower threshold magnitude, can be used to discriminate the ramp events sooner in time, which can improve the speed and responsiveness of the vehicle safety system 10 in responding to the ramp rollover event.

As shown in FIG. 4, the enhanced discrimination algorithm 80 also includes switching metrics 202 that are used to enable or "switch" the discrimination metrics 200 to implement the ramp switched threshold. As shown in FIG. 4, the switching metrics 202 are based on a comparison of P_RATE and R_ANGLE. Viewing the switching metrics 202, the ramp switched threshold can be met in response to a negative P_RATE, i.e., the vehicle pitch is up (nose up), which is consistent with the vehicle traveling up a ramp, such as up a hill or road barrier/divider.

As shown in FIG. 4, the enhanced discrimination algorithm 80 implements Boolean discrimination logic based on the results or outputs of the discrimination metrics 200 and the switching metrics 202. This Boolean logic forms a portion of the ramp discrimination algorithm 84 implemented by the enhanced discrimination algorithm 80. As it pertains to ramp discrimination, the discrimination metrics 200 can output a ramp threshold ON indication (block 206) and/or a ramp switched threshold ON indication (block 208). These indications 206, 208 are outputted by the discrimination metrics 200 in response to the metrics crossing their respective thresholds, as indicated by star symbols at 210 and 212, respectively. The switching metrics 202 outputs a ramp pitch threshold ON indication (block 214) in response to the metrics crossing the ramp pitch switch threshold, as indicated by the star symbol at 216.

This ramp discrimination algorithm 84 is operative to discriminate the occurrence of a ramp rollover crash event, and outputs a ramp discrimination ON indication (block 222) in response to either of two conditions being satisfied at OR block 220. A ramp discrimination ON indication 222 occurs as a result of the ramp threshold ON indication 206 or as the result of both a ramp switched threshold ON indication 208 and a ramp pitch threshold ON indication 214, as shown at AND block 218. Advantageously, implementing the switching metrics 202, the enhanced discrimination algorithm 80 can utilize vehicle pitch rate sensing to lower the ramp discrimination threshold so that the ramp rollover crash event is identified earlier in time, i.e., sooner, than discriminating using the vehicle roll rate alone.

Ramp Classification

Figure 5:
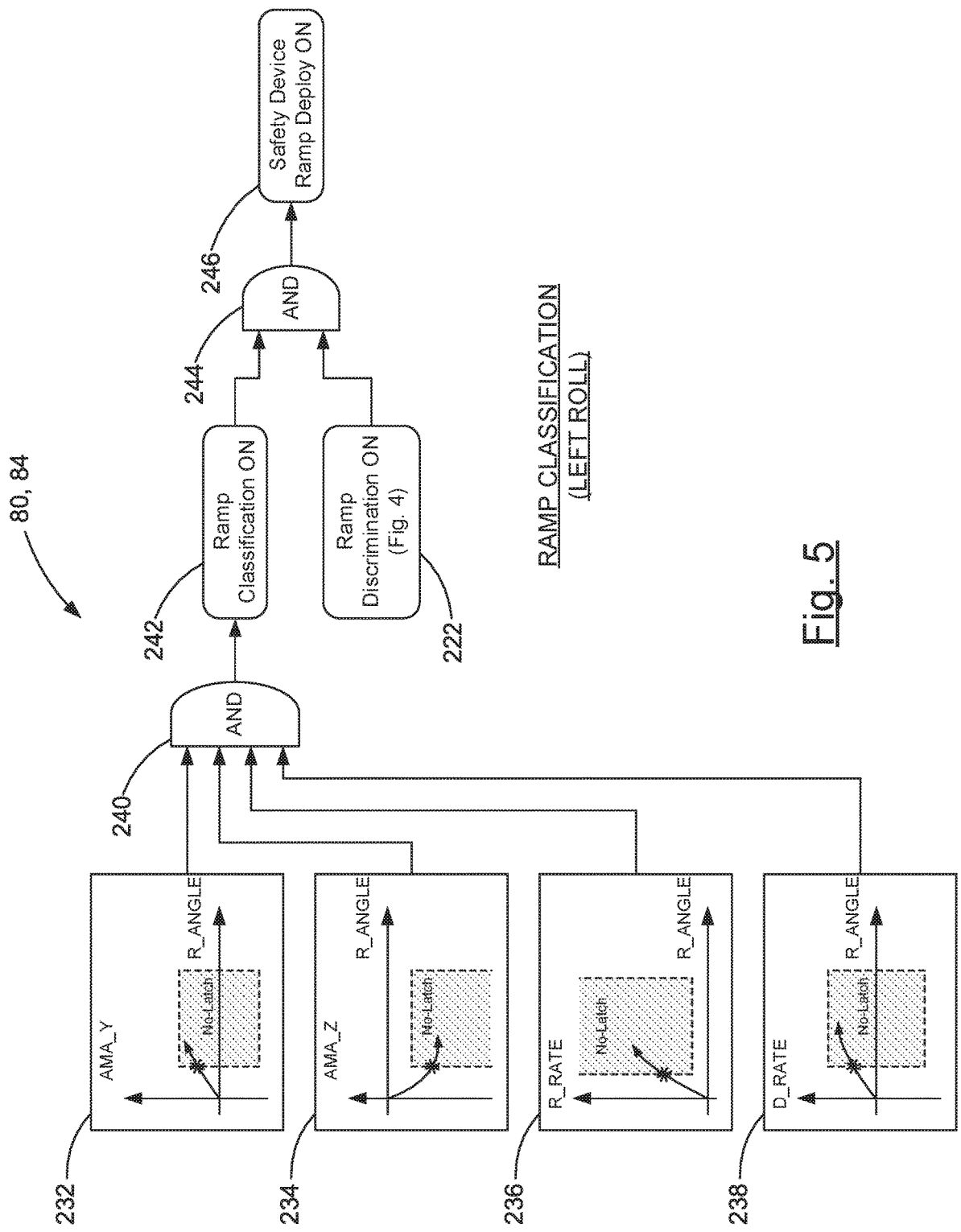
FIG. 5 is a schematic block diagram illustrating classification metrics and deployment logic for a ramp rollover event, implemented in the vehicle safety system.

FIG. 5 illustrates the ramp classification portion of the ramp discrimination algorithm 84 implemented by the enhanced discrimination algorithm 80. The ramp classification portion of the ramp discrimination algorithm 84 uses vehicle metrics to classify a rollover crash event as a ramp event. If confirmed via ramp discrimination (see FIG. 4), the ramp discrimination algorithm 84 issues a command (see block 246) to deploy the vehicle safety devices in a predetermined manner commensurate with the identified ramp event.

The ramp classification portion of the ramp discrimination algorithm 84 of FIG. 5 is shown for left rollover events, i.e., the vehicle rolling to the left or driver side in response to the ramp event. It should, however, be appreciated that the algorithms shown in FIG. 5 also apply to right rollover events, the only difference being sign (+/−) of the values used in the classification metrics is opposite. In other words, the classification metrics for right rollover events would be identical to those shown in FIG. 5, except that the sign of the respective axes for the different metric values within the classification metrics would be opposite, e.g., negative instead of positive and vice versa.

The ramp classification portion of the ramp discrimination algorithm 84 implements four different classification metrics to classify a ramp event. The four ramp classification metrics are:

AMA_Y vs. R_ANGLE (metric 232)
AMA_Z vs. R_ANGLE (metric 234)
R_RATE vs. R_ANGLE (metric 236)
D_RATE vs. R_ANGLE (metric 238)

The lateral acceleration vs. roll angle classification metric 232 utilizes AMA_Y and R_ANGLE to produce an output, which is fed to AND block 240. As shown, the lateral acceleration vs. roll angle classification metric 232 is triggered when the metric crosses the threshold, indicated generally by a dashed line, and enters the shaded trigger zone. This triggering is indicated generally by a star. The metric 232 remains ON while the metric is in the trigger zone. The solid line in the lateral acceleration vs. roll angle classification metric 232 is representative of the metric when the vehicle is undergoing a ramp rollover event. The lateral acceleration vs. roll angle classification metric 200 is a no-latch metric, that is, the metric is ON only when the metric is in the trigger zone.

A vertical acceleration vs. roll angle classification metric 234 utilizes AMA_Z and R_ANGLE to produce an output, which is fed to AND block 240. As shown, the vertical acceleration vs. roll angle classification metric 234 is triggered when the metric crosses the threshold, indicated generally by a dashed line, and enters the shaded trigger zone. This triggering is indicated generally by a star. The metric 234 remains ON when the metric is in the shaded trigger zone bounded by the dashed lines. It should be noted here that, for the trigger zone of metric 234, there is no limit to the magnitude of AMA_Z, which is indicated by the lack of a dashed line threshold for the trigger zone. The solid line in the vertical acceleration vs. roll angle classification metric 234 is representative of the metric when the vehicle is undergoing a ramp rollover event. The vertical acceleration vs. roll angle classification metric 234 is a no-latch metric, that is, the metric is ON only when the metric is in the trigger zone.

A roll rate vs. roll angle classification metric 236 utilizes R_RATE and R_ANGLE to produce an output, which is fed to AND block 240. As shown, the roll rate vs. roll angle classification metric 236 is triggered when the metric crosses the threshold, indicated generally by a dashed line, and enters the shaded trigger zone. This triggering is indicated generally by a star. The metric 236 remains ON when the metric is in the shaded trigger zone bounded by the dashed lines. It should be noted here that, for the trigger zone of metric 236, there is no limit to the magnitude of R_RATE, which is indicated by the lack of a dashed line threshold for the trigger zone. The solid line in the roll rate vs. roll angle classification metric 236 is representative of the metric when the vehicle is undergoing a ramp rollover event. The roll rate vs. roll angle classification metric 236 is a no-latch metric, that is, the metric is ON only when the metric is in the trigger zone.

An angular or roll acceleration vs. roll angle classification metric 238 utilizes D_RATE and R_ANGLE to produce an output, which is fed to AND block 240. As shown, the roll acceleration vs. roll angle classification metric 238 is ON when the metric crosses the threshold, indicated generally by a dashed line, and enters the shaded trigger zone. This triggering is indicated generally by a star. The metric 238 remains ON when the metric is in the shaded trigger zone bounded by the dashed lines. The solid line in the roll acceleration vs. roll angle classification metric 238 is representative of the metric when the vehicle is undergoing a ramp rollover event. The roll acceleration vs. roll angle classification metric 238 is a non-latch metric, that is, the metric is ON only when the metric is in the trigger zone.

The ramp classification portion of the ramp discrimination algorithm 84 implements Boolean logic to determine whether to issue the safety device ramp deploy command 246. As shown in FIG. 5, the safety device ramp deploy command 246 is issued when AND block 244 is ON. AND block 244 is ON in response to ramp discrimination ON (block 222—see FIG. 4) and ramp classification is ON (block 242). Ramp classification block 242 is ON in response to AND block 240, which is ON when all four of the ramp classification metrics 232, 234, 236, and 238 are ON. The ramp classification block 242 can be latched until the roll angle is equal to zero or falls within the reset box (see FIG. 4).

It can therefore be appreciated that the ramp discrimination algorithm 84 implemented in the enhanced discrimination algorithm 80 is operative to issue the safety device ramp deploy command 246 in response to the rollover event being both classified as a ramp event (FIG. 5) and discriminated as a ramp event (FIG. 4). Because, as set forth above, the discrimination is implemented with pitch rate switching, the ramp rollover event can be identified earlier in time and, therefore, the safety device ramp deploy command 246 can also be issued earlier in time.

Enhanced Embankment Discrimination Using Pitch Rate Switching

Figure 6:
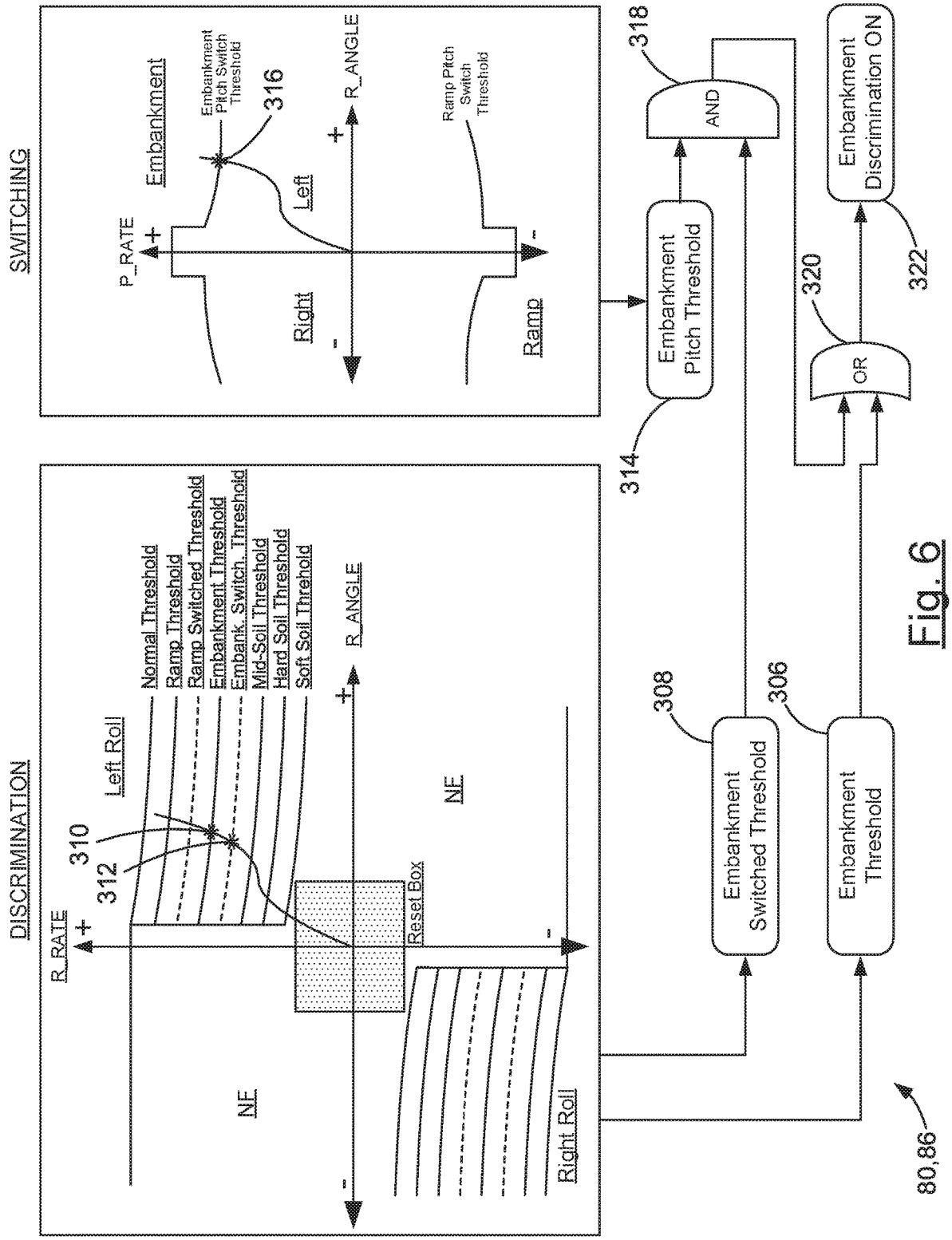
FIG. 6 is a diagram illustrating discrimination and switching metrics for determining the occurrence of an embankment rollover event, implemented in the vehicle safety system.

The enhanced discrimination algorithm 80 implemented by the vehicle safety system 10 also performs enhanced embankment discrimination using pitch rate sensing. This is shown in FIG. 6. The enhanced embankment discrimination using pitch rate switching is similar to the enhanced ramp discrimination with pitch rate switching described above with reference to FIG. 4. In fact, the discrimination metrics and switching metrics used to perform the enhanced embankment discrimination can be the same metrics implemented in FIG. 4, with the addition of an embankment switched threshold to the discrimination metrics and an embankment pitch switch threshold added to the switching metrics. Because of this, for simplicity, the discrimination metrics and switching metrics in FIG. 6 are shown as being identical to those shown in FIG. 4. Those skilled in the art, however, will appreciate that the metrics used for enhanced embankment discrimination and the metrics used for pitch rate sensing can be separate and/or different than those used for ramp discrimination/switching.

Referring to FIG. 6, the enhanced discrimination algorithm 80 implements discrimination metrics 300 that include an embankment switched threshold, which is illustrated in dashed lines. Advantageously, the embankment switched threshold has a magnitude that is lower than the corresponding un-switched counterparts, i.e., the embankment threshold. The switched embankment threshold, having a lower threshold magnitude, can be used to discriminate the embankment events sooner in time, which can improve the speed and responsiveness of the vehicle safety system 10 in responding to the embankment rollover crash event.

As shown in FIG. 6, the enhanced discrimination algorithm 80 also includes switching metrics 302 that are used to enable or "switch" the discrimination metrics 300 to implement the embankment switched threshold. As shown in FIG. 6, the switching metrics 302 are based on a comparison of P_RATE and R_ANGLE. Viewing the switching metrics 302, the embankment switched threshold can be met in response to a positive P_RATE, i.e., the vehicle pitch is down (nose down), which is consistent with the vehicle traveling down an embankment, such as down a hill or into a ditch.

As shown in FIG. 6, the enhanced discrimination algorithm 80 implements Boolean discrimination logic based on the results or outputs of the discrimination metrics 300 and the switching metrics 302. As it pertains to embankment discrimination, the discrimination metrics 300 can output an embankment threshold ON indication (block 306) and/or an embankment switched threshold ON indication (block 308). These indications 306, 308 are outputted by the discrimination metrics 300 in response to the metrics crossing their respective thresholds, as indicated by star symbols at 310 and 312, respectively. The switching metrics 302 outputs an embankment pitch threshold ON indication (block 314) in response to the metrics crossing the embankment pitch switch threshold, as indicated by the star symbol at 316.

The embankment discrimination algorithm 86 is operative to discriminate the occurrence of an embankment rollover crash event, and outputs an embankment discrimination ON indication (block 322) in response to either of two conditions being satisfied at OR block 320. An embankment discrimination ON indication 322 occurs as a result of the embankment threshold ON indication 306 or as the result of both an embankment switched threshold ON indication 308 and an embankment pitch threshold ON indication 314, as shown at AND block 318. Advantageously, implementing the switching metrics 302, the enhanced discrimination algorithm 80 can utilize vehicle pitch rate sensing to lower the embankment discrimination threshold so that the embankment rollover crash event is identified earlier in time, i.e., sooner, than discriminating using the vehicle roll rate alone.

Embankment Classification

FIG. 7 illustrates the embankment classification portion of the embankment discrimination algorithm 86 implemented by the enhanced discrimination algorithm 80. The embankment classification portion of the embankment discrimination algorithm 86 uses vehicle metrics to classify a rollover crash event as an embankment event. If confirmed via an embankment discrimination (see FIG. 6), the embankment discrimination algorithm 86 issues a command (see block 346) to deploy the vehicle safety devices in a predetermined manner commensurate with the identified embankment event.

The embankment classification portion of the embankment discrimination algorithm 86 of FIG. 7 is shown for left rollover events, i.e., the vehicle rolling to the left or driver side in response to the embankment event. It should, however, be appreciated that the algorithms shown in FIG. 7 also apply to right rollover events, the only difference being sign (+/−) of the values used in the classification metrics is opposite. In other words, the classification metrics for right rollover events would be identical to those shown in FIG. 7, except that the sign of the respective axes for the different metric values within the classification metrics would be opposite, e.g., negative instead of positive and vice versa.

The embankment classification portion of the embankment discrimination algorithm 86 implements four different classification metrics to classify an embankment event. The four embankment classification metrics are:
AMA_Y vs. R_ANGLE (metric 332)
AMA_Z vs. R_ANGLE (metric 334)
R_RATE vs. R_ANGLE (metric 336)
D_RATE vs. R_ANGLE (metric 338)

The lateral acceleration vs. roll angle classification metric 332 utilizes AMA_Y and R_ANGLE to produce an output, which is fed to AND block 340. As shown, the lateral acceleration vs. roll angle classification metric 332 is triggered when the metric crosses the threshold, indicated generally by a dashed line, and enters the shaded trigger zone. This triggering is indicated generally by a star. The metric 332 remains ON when the metric is in the shaded trigger zone bounded by the dashed lines. The solid line in the lateral acceleration vs. roll angle classification metric 332 is representative of the metric when the vehicle is undergoing an embankment rollover event. The lateral acceleration vs. roll angle classification metric 300 is a no-latch metric, that is, the metric is ON only when the metric is in the trigger zone.

A vertical acceleration vs. roll angle classification metric 334 utilizes AMA_Z and R_ANGLE to produce an output, which is fed to AND block 340. As shown, the vertical acceleration vs. roll angle classification metric 334 is triggered when the metric crosses the threshold, indicated generally by a dashed line, and enters the shaded trigger zone. This triggering is indicated generally by a star. The metric 334 remains ON when the metric is in the shaded trigger zone bounded by the dashed lines. It should be noted here that, for the trigger zone of metric 334, there is no limit to the magnitude of AMA_Z, which is indicated by the lack of a dashed line threshold for the trigger zone. The solid line in the vertical acceleration vs. roll angle classification metric 334 is representative of the metric when the vehicle is undergoing an embankment rollover event. The vertical acceleration vs. roll angle classification metric 334 is a no-latch metric, that is, the metric is ON only when the metric is in the trigger zone.

A roll rate vs. roll angle classification metric 336 utilizes R_RATE and R_ANGLE to produce an output, which is fed to AND block 340. As shown, the roll rate vs. roll angle classification metric 336 is triggered when the metric crosses the threshold, indicated generally by a dashed line, and enters the shaded trigger zone. This triggering is indicated generally by a star. The metric 336 remains ON when the metric is in the shaded trigger zone bounded by the dashed lines. It should be noted here that, for the trigger zone of metric 336, there is no limit to the magnitude of R_RATE, which is indicated by the lack of a dashed line threshold for the trigger zone. The solid line in the roll rate vs. roll angle classification metric 336 is representative of the metric when the vehicle is undergoing an embankment rollover event. The roll rate vs. roll angle classification metric 336 is a no-latch metric, that is, the metric is ON only when the metric is in the trigger zone.

An angular or roll acceleration vs. roll angle classification metric 338 utilizes D_RATE and R_ANGLE to produce an output, which is fed to AND block 340. As shown, the roll acceleration vs. roll angle classification metric 338 is ON when the metric crosses the threshold, indicated generally by a dashed line, and enters the shaded trigger zone. This triggering is indicated generally by a star. The metric 338 remains ON when the metric is in the shaded trigger zone bounded by the dashed lines. The solid line in the roll acceleration vs. roll angle classification metric 338 is representative of the metric when the vehicle is undergoing an embankment rollover event. The roll acceleration vs. roll angle classification metric 338 is a non-latch metric, that is, the metric is ON only when the metric is in the trigger zone.

The embankment classification portion of the embankment discrimination algorithm 86 implements Boolean logic to determine whether to issue the safety device embankment deploy command 346. As shown in FIG. 7, the safety device embankment deploy command 346 is issued when AND block 344 is ON. AND block 344 is ON in response to embankment discrimination ON (block 322—see FIG. 6) and embankment classification is ON (block 342). Embankment classification block 342 is ON in response to AND block 340, which is ON when all four of the embankment classification metrics 332, 334, 336, and 338 are ON. The embankment classification block 342 can be latched until the roll angle is equal to zero or falls within the reset box (see FIG. 6).

It can therefore be appreciated that the embankment discrimination algorithm 86 implemented by the enhanced discrimination algorithm 80 is operative to issue the safety device embankment deploy command 346 in response to the rollover crash event being both classified as an embankment event (FIG. 7) and discriminated as an embankment event (FIG. 6). Because, as set forth above, the discrimination is implemented with pitch rate switching, the embankment rollover event can be identified earlier in time and, therefore, the safety device embankment deploy command 346 can also be issued earlier in time.

From the above description of the invention, those skilled in the art will appreciate that the described vehicle safety system and methods implement algorithms that can discriminate ramp and embankment rollover events using thresholds determined by pitch rate switching to improve the responsiveness of the system. Those skilled in the art will also perceive improvements, changes and modifications to the disclosed system and methods that fall within the spirit and scope of the invention. These improvements, changes, and/or modifications are intended to be covered by the appended claims.

Having described the invention, the following is claimed:

1. A vehicle safety system comprising:
   an actuatable restraint for helping to protect a vehicle occupant; and
   a controller for controlling actuation of the actuatable restraint in response to a vehicle rollover event;
   wherein the controller is configured to execute a roll discrimination metric that discriminates the occurrence of a ramp rollover event or an embankment rollover event in response to a vehicle roll rate having a magnitude that exceeds a predetermined threshold roll rate; and
   wherein the controller is also configured to execute a switching metric that is operative to evaluate the pitch rate and to reduce the predetermined threshold roll rate in response to a vehicle pitch rate having a magnitude that exceeds a predetermined threshold pitch rate.

2. The vehicle safety system recited in claim 1, wherein the roll discrimination metric evaluates the roll rate to detect the occurrence of:
   a ramp event in response to the roll rate having a magnitude that exceeds a ramp event threshold, or
   an embankment event in response to the roll rate having a magnitude that exceeds an embankment event threshold.

3. The vehicle safety system recited in claim 2, wherein, in response to the pitch rate having a magnitude that exceeds the predetermined threshold pitch rate, the roll discrimination metric evaluates the roll rate to detect the occurrence of:
   a ramp event in response to the roll rate having a magnitude that exceeds a switched ramp event threshold, or
   an embankment event in response to the roll rate having a magnitude that exceeds a switched embankment event threshold.

4. The vehicle safety system recited in claim 1, wherein the roll discrimination metric evaluates the roll rate vs. vehicle roll angle.

5. The vehicle safety system recited in claim 1, wherein the switching metric evaluates the pitch rate to detect the occurrence of:
   a switch ramp event threshold condition in response to the pitch rate having a magnitude that exceeds a ramp pitch switch threshold, or
   a switch embankment event threshold condition in response to the pitch rate having a magnitude that exceeds an embankment pitch switch threshold.

6. The vehicle safety system recited in claim 1, wherein the switching metric evaluates the pitch rate vs. vehicle roll angle.

7. The vehicle safety system recited in claim 1, wherein the controller is further configured to execute at least one of a ramp discrimination algorithm comprising a ramp classification portion configured to classify a ramp event, and an embankment discrimination algorithm comprising an embankment classification portion configured to classify an embankment event;
   wherein the controller is configured to deploy the actuatable restraint in response to the roll discrimination metric discriminating the occurrence of a ramp rollover event and the ramp classification portion classifying a ramp event; and
   wherein the controller is configured to deploy the actuatable restraint in response to the embankment discrimination metric discriminating the occurrence of an embankment rollover event and the embankment classification portion classifying an embankment event.

8. The vehicle safety system recited in claim 1, further comprising:
   an accelerometer for sensing vehicle lateral acceleration and providing a signal indicative of sensed vehicle lateral acceleration;
   an accelerometer for sensing vehicle vertical acceleration and providing a signal indicative of sensed vehicle vertical acceleration;
   a roll sensor for sensing vehicle roll values and providing a signal indicative of sensed vehicle roll values; and
   a pitch sensor for sensing vehicle pitch values and providing a signal indicative of sensed vehicle pitch,
   wherein the controller is configured to execute the roll discrimination metric and the switching metric using the signals provided by the accelerometers, the roll rate sensor, and the pitch rate sensor.

9. The vehicle safety system recited in claim 1, wherein the actuatable restraints comprise at least one of seatbelt anchor pretensioners, seatbelt retractor pretensioners, curtain airbags, thorax airbags, and side airbags.

10. A method for controlling actuation of an actuatable restraint in response to a vehicle rollover event, comprising:
    providing a controller that is operatively connected to at least one sensor and is configured to control actuation of the inflatable restraint;
    configuring the controller to obtain, via the at least one sensor, a vehicle roll rate;
    configuring the controller to discriminate the occurrence of a ramp rollover event or an embankment rollover event in response to a vehicle roll rate having a magnitude that exceeds a predetermined threshold roll rate;
    configuring the controller to reduce the predetermined threshold roll rate in response to a vehicle pitch rate having a magnitude that exceeds a predetermined threshold pitch rate; and
    configuring the controller to implement the reduced threshold roll rate to control actuation of the actuatable restraint.

11. The method recited in claim 10, wherein discriminating the occurrence of a ramp rollover event or an embankment rollover event comprises at least one of:
    evaluating the roll rate to detect the occurrence of a ramp event in response to the roll rate having a magnitude that exceeds a ramp event threshold; and
    evaluating the roll rate to detect the occurrence of an embankment event in response to the roll rate having a magnitude that exceeds an embankment event threshold.

12. The method recited in claim 11, wherein the controller is further configured to detect the occurrence of at least one of the following in response to the pitch rate having a magnitude that exceeds the predetermined threshold pitch rate:
    a ramp event in response to the roll rate having a magnitude that exceeds a switched ramp event threshold; and an embankment event in response to the roll rate having a magnitude that exceeds a switched embankment event threshold.

13. The method recited in claim 10, wherein discriminating the occurrence of a ramp rollover event or an embankment rollover event comprises evaluating the roll rate vs. vehicle roll angle.

14. The method recited in claim 10, wherein reducing the predetermined threshold roll rate in response to a vehicle pitch rate having a magnitude that exceeds a predetermined threshold pitch rate comprises evaluating the pitch rate to detect the occurrence of:
- a switch ramp event threshold condition in response to the pitch rate having a magnitude that exceeds a ramp pitch switch threshold, or
- a switch embankment event threshold condition in response to the pitch rate having a magnitude that exceeds an embankment pitch switch threshold.

15. The method recited in claim 10, wherein reducing the predetermined threshold roll rate in response to a vehicle pitch rate having a magnitude that exceeds a predetermined threshold pitch rate comprises evaluating the pitch rate vs. vehicle roll angle.

16. The method recited in claim 10, further comprising:
classifying a rollover event as a ramp event or an embankment event;
deploying the actuatable restraint in response to classifying the rollover event as a ramp event and discriminating the occurrence of a ramp rollover event; and
deploying the actuatable restraint in response to classifying the rollover event as an embankment event and discriminating the occurrence of an embankment rollover event.

17. A vehicle safety system comprising:
an actuatable restraint for helping to protect a vehicle occupant; and
a controller for controlling actuation of the actuatable restraint according to the method recited in claim 10.

18. The vehicle safety system recited in claim 10, wherein the at least one sensor comprises:
an accelerometer for sensing vehicle lateral acceleration and providing a signal indicative of sensed vehicle lateral acceleration;
an accelerometer for sensing vehicle vertical acceleration and providing a signal indicative of sensed vehicle vertical acceleration;
a roll sensor for sensing vehicle roll values and providing a signal indicative of sensed vehicle roll values; and
a pitch sensor for sensing vehicle pitch values and providing a signal indicative of sensed vehicle pitch,
wherein the controller is configured to execute the roll discrimination metric and the switching metric using the signals provided by the accelerometers, the roll rate sensor, and the pitch rate sensor.

19. The system recited in claim 17, wherein the actuatable restraints comprise at least one of seatbelt anchor pretensioners, seatbelt retractor pretensioners, curtain airbags, thorax airbags, and side airbags.

* * * * *